(12) United States Patent
Bachmaier et al.

(10) Patent No.: US 9,174,618 B2
(45) Date of Patent: Nov. 3, 2015

(54) BRAKE AND BRAKING ACTUATION UNITS

(71) Applicant: Siemens Aktiengesellschaft, Munich (DE)

(72) Inventors: Georg Bachmaier, Munich (DE); Gunter Freitag, Munich (DE); Andreas Goedecke, Munich (DE); Karl-Josef Kuhn, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 167 days.

(21) Appl. No.: 13/915,765

(22) Filed: Jun. 12, 2013

(65) Prior Publication Data

US 2013/0327605 A1 Dec. 12, 2013

(30) Foreign Application Priority Data

Jun. 12, 2012 (DE) .......................... 10 2012 209 799

(51) Int. Cl.
| | |
|---|---|
| *B60T 13/00* | (2006.01) |
| *B60T 13/10* | (2006.01) |
| *F16D 51/08* | (2006.01) |
| *F16D 55/20* | (2006.01) |
| *F16D 125/14* | (2012.01) |

(52) U.S. Cl.
CPC ............... *B60T 13/10* (2013.01); *F16D 51/08* (2013.01); *F16D 55/20* (2013.01); *F16D 2125/14* (2013.01); *Y10T 137/85978* (2015.04)

(58) Field of Classification Search
CPC ...... F16D 55/12; F16D 55/00; B60W 30/045; B60W 10/06; B60W 10/08; B60W 10/14; B60W 10/16; B60T 13/10; B60T 13/12; B60T 13/14; B60T 8/1755
USPC ........................................ 188/361, 72.4, 72.2
See application file for complete search history.

(56) References Cited

U.S. PATENT DOCUMENTS

| | | | | |
|---|---|---|---|---|
| 2,995,216 | A | | 8/1961 | Jeffries ..................... 188/72.3 |
| 4,042,072 | A | * | 8/1977 | Baba ........................ 188/71.8 |
| 4,077,499 | A | | 3/1978 | Baram ....................... 188/72.4 |
| 4,553,644 | A | | 11/1985 | Folch ........................ 188/72.4 |
| 5,772,221 | A | | 6/1998 | Daley ..................... 280/11.204 |
| 6,230,851 | B1 | * | 5/2001 | Yoshizawa et al. ........ 188/71.1 |
| 2011/0233009 | A1 | * | 9/2011 | Suzuki et al. ............. 188/72.4 |

FOREIGN PATENT DOCUMENTS

| | | | | |
|---|---|---|---|---|
| DE | 2521575 A1 | 12/1976 | ............. | F16D 55/10 |
| WO | 97/18867 A1 | 5/1997 | ............. | A63C 17/14 |

OTHER PUBLICATIONS

Chinese Office Action, Application No. 201310233108.0, 14 pages, Apr. 9, 2015.

* cited by examiner

*Primary Examiner* — Melanie Torres Williams
(74) *Attorney, Agent, or Firm* — Slayden Grubert Beard PLLC

(57) ABSTRACT

A brake may include a bellows having an opening that leads into the interior of the bellows, a brake element joined to the bellows, a rotational element arranged at a distance from the brake element, a fluid reservoir or a pressure production unit, and a first conduit between the fluid reservoir or the pressure production unit and the opening.

19 Claims, 6 Drawing Sheets

BRAKE AND BRAKING ACTUATION UNITS

CROSS-REFERENCE TO RELATED APPLICATIONS

This application claims priority to DE Patent Application No. 10 2012 209 799.6 filed Jun. 12, 2012. The contents of which is incorporated herein by reference in its entirety.

TECHNICAL FIELD

This disclosure relates to a brake and to braking actuation units.

BACKGROUND

Numerous brake systems are known for vehicles and also for other purposes, e.g. hydraulic brake systems with central pressure generation and with central control. As a result of the central pressure production long brake lines, for example longer than one meter, are typical. Known examples are disk brakes with brake cylinders, or drum brakes with brake shoes which are also actuated by brake cylinders.

SUMMARY

One embodiment provides a brake, comprising a bellows which incorporates an opening which leads into the interior of the bellows, a brake element joined to the bellows, a rotational element which is arranged at a distance from the brake element, a fluid reservoir or a pressure production unit, and a first conduit between the fluid reservoir or the pressure production unit and the opening.

Another embodiment provides an actuation unit, comprising a bellows, and a fluid reservoir and/or pressure production unit arranged in the bellows or forming a part of the bellows.

In a further embodiment of such a brake or actuation unit, the bellows incorporates a metallic material or is manufactured from a metallic material, e.g., from a metal.

In a further embodiment of such a brake or actuation unit, the bellows is a first bellows and in which the fluid reservoir incorporates a second bellows.

In a further embodiment of such a brake or actuation unit, the second bellows incorporates a metallic material or is manufactured from a metallic material, e.g., from a metal.

In a further embodiment of such a brake or actuation unit, the rotational element is a circular shaped plate or a drum.

In a further embodiment of such a brake or actuation unit, the switching unit is a valve.

In a further embodiment, the brake or actuation unit comprises a pump unit in addition to the fluid reservoir or in which the pressure production unit is or incorporates a pump unit.

In a further embodiment, the brake or actuation unit comprises a drive unit for the pump unit.

In a further embodiment, the brake or actuation unit comprises a housing which contains the fluid reservoir, the switching unit, the first conduit and the second conduit.

In a further embodiment, the housing has a metallic seal or has a metallically sealed joint to the bellows.

In a further embodiment, the bellows includes or has a cross-section which is non-circular in shape.

In a further embodiment, the gap between the fluid reservoir or pressure production unit and the bellows is less than 15 centimeters.

Another embodiment provides an actuation unit, comprising: a housing, a bellows which is arranged on the housing or forms a part of the housing, which incorporates an opening which leads into the interior of the bellows, a fluid reservoir or pressure production unit which is arranged in the housing or forms a part of the housing, and a conduit which is arranged in the housing or forms a part of the housing, which connects the fluid reservoir or the pressure production unit and the opening or is a part of a conduit system to which are adjoined the fluid reservoir or the pressure production unit and the opening.

In a further embodiment, a brake or actuation unit as disclosed above comprises a switching unit, e.g., a switching unit which in an unexcited state opens a conduit for a fluid.

BRIEF DESCRIPTION OF THE DRAWINGS

Example embodiments of the invention are explained with reference to the attached drawings, in which.

DETAILED DESCRIPTION

Figure 1:
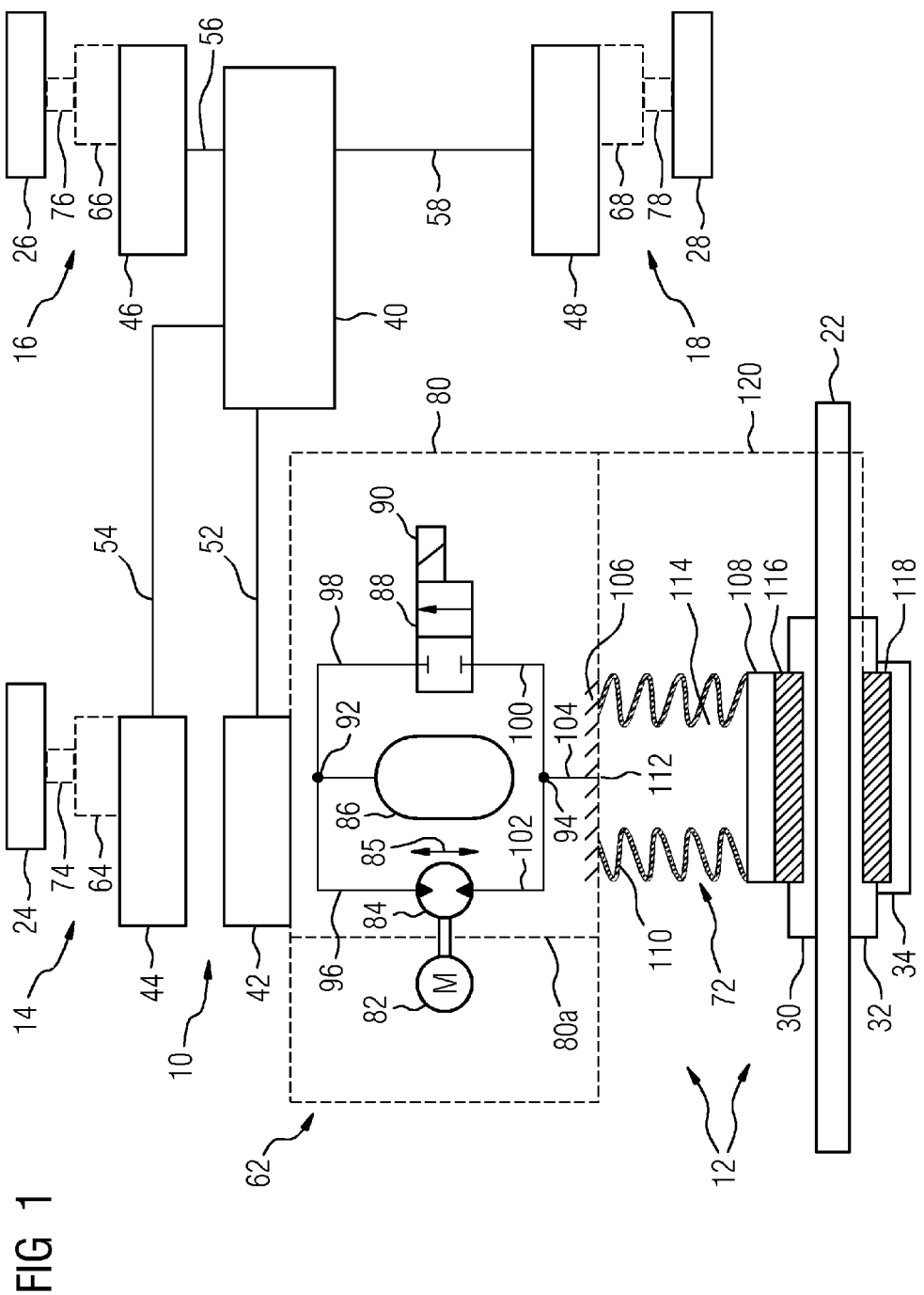
FIG. 1 shows a vehicle with bellows brakes and hydraulic wheel modules.

The disclosure relates to a brake comprising:
preferably a brake mounting plate,
a bellows, preferably arranged on the brake mounting plate, which incorporates an opening leading into the interior of the bellows,
a brake element which is connected to the bellows,
a rotational element, which is arranged at a distance from the brake element,
a fluid storage unit (reservoir) or a pressure production unit, e.g., a bidirectional pump,
an optional switching unit, e.g. a valve (normally open),
a first conduit between the fluid reservoir or the pressure production unit and the opening.

The disclosure also relates to an actuation unit, comprising:
a bellows,
arranged in the bellows or forming part of the bellows, a fluid storage unit (reservoir) and/or the pressure production unit, in particular a bidirectional pump.

In addition the disclosure relates to an actuation unit comprising:
a housing,
arranged on the housing or forming part of the housing, a bellows which incorporates an opening which leads into the interior of the bellows,
a fluid storage unit (reservoir) or a pressure production unit, in particular a bidirectional pump, arranged in the housing or forming part of the housing,
arranged in the housing or forming part of the housing, a conduit which connects the fluid reservoir or the pressure production unit and the opening, or is part of a conduit system to which are adjoined the fluid reservoir or the pressure production unit and the opening.

Example embodiments specify a brake which is, in particular, simply constructed, which is, in particular, subject to low wear and/or which is, in particular, low maintenance and durable. In addition, brake actuation units and an associated method are to be specified.

One exemplary embodiment relates to a brake comprising:
preferably a brake mounting plate,
a bellows, preferably arranged on the brake mounting plate, which incorporates an opening leading into the interior of the bellows,
a brake element which is joined to the bellows,
a rotational element, which is arranged at a distance from the brake element,
a fluid reservoir or a pressure production unit,
an optional switching unit,
a first conduit between the fluid reservoir or the pressure production unit and the opening.

The bellows can be arranged on a brake mounting plate. The brake mounting plate can be part of a chassis of a vehicle, or can be attached to such a chassis. The brake can serve to reduce the speed of the vehicle or to hold the vehicle in position when it is stationary, for example when the vehicle is parked on a slope.

Unlike a brake cylinder, a bellows is sealed, i.e. it is not possible for example for oil or gas to escape or penetrate it, and no dirt can get in. Apart from this, with a bellows there is, compared for example with a hydraulic piston, no friction between a piston guide and the piston. In the case of a bellows, there can be a change in curvature on segments of the bellows wall, which effect a change in the length of the bellows when the pressure is increased.

The sidewall of the bellows can have a wave shape. Alternatively however, the bellows can also have a folded wall, or a wall made of individual segments which are then joined to each other, for example by crimping.

In the bellows there can be at least one opening, or there can be several openings. The openings can be used for the entry and egress of a fluid, i.e. a medium which can flow. The fluid can preferably be a liquid which is essentially incompressible, for example by comparison with a gas or a gas mixture. A liquid, i.e. a hydraulic system, makes possible in particular very rapid braking.

The brake element can be a brake lining which, for example, contains organic additives, such as resin or rubber. But sintered materials can also be used, in particular with or without organic material additives.

The rotational element can, for example, be a brake disk or a brake drum, i.e. it has a geometric form which permits it to turn without imbalance, i.e. to run smoothly.

The fluid storage unit is used, in particular, for storing the fluid under high pressure, e.g. at a pressure of 1 bar (ambient pressure at sea level), greater than 1 bar, greater than 5 bar or greater than 15 bar. The fluid storage unit is also referred to as a reservoir.

The pressure production unit can be a pump unit, in particular a pressure pump. The pressure production unit can be a bidirectional pump, which enables a fluid to be transported in two opposing directions.

The fluid reservoir and the pressure production unit can be used in combination to obtain particularly effective braking. So, for example, in 5 milliseconds (ms) a pressure of more than 50 kN (kilonewtons) or 50000 newtons can be released. The power during braking can amount to more than 1200 watts per wheel.

The optional switching unit can be a valve which, for example, has two or more connections and for example two or more than two switch settings. In particular, a valve is used which is open, i.e. permits the passage of fluid, when no external excitation force is applied. Such valves are also referred to as "normally open". In the case of braking, these valves serve to satisfy the safety requirements, according to which the brake must be released when there is a failure of the excitation force.

The use of a bellows, in particular a metal bellows or a metal bellows, as applicable, permits a closed braking system to be constructed which, in particular, can be maintenance-free, for example over a period of 10 years or more than ten years. In particular, a fluid in the braking system will not be exchanged over a period of at least 10 years, preferably not even with the entire service life of the product.

Another exemplary embodiment relates to an actuation unit comprising:
a bellows,
a fluid reservoir and/or pressure production unit arranged in the bellows or forming a part of the bellows.

This exemplary embodiment is based on the recognition that the built-in items are in any case laid out for a high pressure which can be applied not only from inside but also from outside without damaging the built-in items. Thus, for example, a high external pressure will have no detrimental effect on a fluid reservoir.

The additional actuation unit can also be used in a brake, in particular in a brake for braking a vehicle or one of the pieces of equipment mentioned above or below, as applicable.

In embodiments, the second actuation unit is used in combination with one of the exemplary embodiments or configurations explained below. Hence the technical effects cited below will apply correspondingly.

The fluid reservoir or pressure production unit, as applicable, and the conduit then form a part of the bellows, in particular, if one of their outer walls forms a component of the outer wall of the bellows.

The technical effect of an arrangement of built-in items in the bellows can be that with a compact construction the mechanical rigidity of the bellows is increased, because it contains less of a fluid which, by comparison with the built-in items is more easily compressible. So the built-in items can occupy more than 50 percent of the internal volume of the bellows.

The bellows can contain a metallic material or be manufactured from a metallic material, in particular from a metal. A metal is electrically conductive. Hence the bellows can be manufactured, for example, galvanically. The shape of a metallic core can define the shape of the bellows during the galvanization. Galvanization is effected, for example, using an external current. After the galvanization, the core can, for example, be dissolved and hence removed using a chemical. It is also possible to galvanically build up layers of materials which differ from one another.

However, for the purpose of manufacturing the bellows it is also possible to use other metal-working processes, such as drawing or forming. Typical metals for bellows are iron compounds, in particular steel, nickel compounds etc.

However, other high-strength materials can also be used.

In one embodiment, the bellows can incorporate an expandable section. The expandable section can incorporate a circumferential side wall for which, as the distance from the opening increases, the distance between points which lie opposite one another repeatedly increases and then reduces again, in particular does so periodically, e.g. more than twice, more than three times or more than four times. In particular, a bellows with a wave-shaped wall is used. But even folding bellows or other bellows are suitable. The diameter of bellows with a circular cross-section can, for example, change by more than 1 millimeter or by more than 5 millimeters, while the length of the bellows remains constant, i.e. for example like a wavy line. As it does so, the thickness of the wall can remain essentially the same, e.g. with fluctuations less than 1 millimeter (mm) or less than 0.1 millimeters.

The thickness of the wall lies, for example, in the range from 0.2 millimeters (mm) up to 2 millimeters. The distance between points lying opposite one another on the sidewall is, for example, between 5 centimeters and 10 centimeters.

A bellows with a double wall, triple wall, etc., can also be used.

The bellows with the brake element can be a first bellows. The fluid reservoir can incorporate a second bellows. In this case, the bellows as a constructional element is used both for the purpose of storing fluid and also for the purpose of actuating the brake. The two bellows can be matched to one another, for example in respect of the same pressure and the same storage or working volumes. It is also possible to use more than two bellows in the brake, for example a larger bellows in the fluid reservoir and two, or more than two, smaller bellows on a wheel for the purpose of braking.

The second bellows can also incorporate a metallic material or be manufactured from a metallic material, in particular from a metal. In the manufacture of the second bellows, the processes specified above for the first bellows can be used.

With one embodiment, the second bellows can incorporate an expandable section. The expandable section can incorporate a circumferential side wall for which, as the distance from the opening increases, the distance between points which lie opposite one another repeatedly increases and then reduces again, in particular does so periodically, e.g. more than twice, more than three times or more than four times. In particular, a second bellows with a wave-shaped wall is used. But folding bellows or other bellows are also suitable. The diameter of bellows with a circular cross-section can, for example, change by more than 1 millimeter or by more than 5 millimeters, while the length of the bellows remains constant. As it does so, the thickness of the wall can remain essentially the same, e.g. with fluctuations less than 1 millimeter (mm) or less than 0.1 millimeters.

The thickness of the wall of the second bellows lies, for example, in the range from 0.2 millimeters (mm) up to 2 millimeters. The distance between points lying opposite one another on the sidewall is, for example, between 5 centimeters and 10 centimeters or between 5 centimeters and 15 centimeters.

A second bellows with a double wall, triple wall, etc., can also be used.

The second bellows can be made bigger than the first bellows, in particular if more than one bellows is driven from the fluid reservoir.

The rotational element can be a circular-shaped disk or a drum. In this case, no imbalance arises during its rotation. The drum also contains a circular disk on which can be arranged a wall at an angle, preferably of 90 degrees, to the direction towards the perimeter.

Thus the brake is either a disk brake of a drum brake, as applicable, with very good braking characteristics. The circular-shaped disk can be free of recesses or can contain recesses, for example for cooling purposes or for weight reduction.

The switching unit can be a valve. In particular, an electrically actuated valve can be used, e.g. a 2/2-way valve, i.e. a valve with two fluid connections and with two switch settings.

The brake can incorporate a pump unit in addition to the fluid reservoir, or the pressure production unit can be or can incorporate a pump unit. Between the pump unit and the pressure production unit there can be a third conduit in the case when a fluid reservoir is present.

For the pump unit, use can be made of a reciprocating pump, an axial pump or a diaphragm pump. In the case of a reciprocating pump or a diaphragm pump, the pump can also incorporate valves which determine the direction of the fluid movement during pumping. Diaphragm pumps with piezocrystals can be used. Piezocrystals permit the generation of a high force and thus a high pressure combined with highly dynamic switching. Apart from this, piezocrystals permit the production of high pressures. Piezocrystals can be easily encapsulated, for example when an additional bellows is being used. Alternatively it is possible, for example, to use a Lorentz actuator as the pump unit.

In one configuration, the pump unit incorporates a pressure pump which can produce a pressure greater than 10 megapascals (MPa) or greater than 10 bar. The pressure pump can be a diaphragm pump, in particular a diaphragm pump which is driven by a piezocrystal.

In one configuration, a fourth conduit can be arranged between the pump unit and the opening. For example, the fourth conduit can create a circulation in the conduit system.

The brake can incorporate a drive unit for the pump unit. In one configuration, the drive unit incorporates a piezocrystal, which is maintenance-free even over decades. But an electric motor can also be used as the drive.

The brake can incorporate a housing which contains the fluid reservoir, the optional switching unit and the first conduit.

The housing can be encapsulated, i.e. it forms a capsule surrounding the units mentioned. An encapsulated construction enables the fluid to be used for a long time, for example over a period which is greater than 10 years. In particular, the flow characteristics of the fluid are not degraded by air or moisture penetration. Pollution of the fluid is also excluded by the encapsulation. Furthermore, because of the encapsulation, no air or gas bubbles can form in the brake system, so that the full braking efficiency is maintained over the entire operational life, for example more than ten years.

The pump unit and, if applicable, the drive unit can also be arranged within the housing. Alternatively it is possible, in particular in the case of a diaphragm pump, for the diaphragm to form part of the encapsulated housing. It is then a simple possibility to arrange the drive unit, for example a piezocrystal, outside the housing on the diaphragm.

The housing can have a metallic seal or can have a metallically sealed joint to the bellows. Here, metallically sealed means that any water penetration and/or gas penetration is prevented. Hence, even after ten years the blocking effect can still exist, and can ensure that the fluid has unimpaired usage characteristics.

Examples of metallically sealed joints are for example soldering and welding. But it is also possible to effect the manufacture of the bellows and housing in one piece, for example using galvanic processes.

In one embodiment, the housing has at least one throughhole for an electrically conducting connection. Since no mechanical movement needs to be transferred at the throughhole, the through-hole can be well sealed off, for example using a setting plastic.

The electrically conducting connection is used, for example, for the transmission of control signals conforming to one of the following protocols:

FlexRay,
Profinet,
CAN bus (Controller Area Network),
Ethernet (IEEE 802.x), or
LIN (Local Interconnect Network).

Alternatively, the connection can be used for the energy supply to a drive unit for a pump or a drive unit for the switching unit, for example for an electromagnet.

In a next configuration, the brake is used in an electrically driven vehicle, i.e. in an electric vehicle. In these vehicles, braking can be effected by energy feedback in the electric motor. As a result, mechanical brakes can be smaller in design. The braking force of small bellows brakes can itself be sufficient, for example, to assist the braking process, or in the manner of a parking brake to prevent the vehicle running away on a slope.

The brake can be arranged in or on a wheel hub motor. Wheel hub motors are electric motors with an especially compact construction. Thus all the mechanical or fluid units which are required for braking can be located on a wheel. These units can be compact in arrangement and in particular can be encapsulated. The power supply or the control signals, as applicable, may be all that comes from a central controller.

A wheel hub motor is an electric motor which is integrated into a wheel of a vehicle. The windings of the motor can be arranged each at the same distance from the wheel hub, in particular in the neighborhood of the perimeter of a wheel, i.e. centrically.

On the wheel hub motor, the units or elements of the brake are exposed to particular stresses and particular environmental conditions, for example in comparison to an arrangement in the interior of a vehicle. For this reason, encapsulation can be especially effective. The space remaining available on a wheel hub motor for installation of the brake is especially small, for example in comparison to the installation space in the case of a vehicle with a central motor. However, the units of the brake can be arranged very compactly together. The compact construction also permits short response times for the brake, due to the short hydraulic paths.

However, the brake can be generally used for electric vehicles, combustion fuel vehicles or hybrid vehicles, i.e. with a combined drive e.g. electric motor and combustion engine. Even a small bellows brake can, particularly in the case of light vehicles or a light construction, provide a sufficiently high braking force.

The brake can also be used for other purposes, in particular applications which require a compact and/or encapsulated design, such as for example brakes for wind turbines or brakes for aircraft wheels.

The bellows can incorporate or have a cross-section which is not circular in shape. The non-circular cross-section will lie, in particular, in a plane which is parallel to a flat base surface and/or to a flat surface of a lid/closure of the bellows. A non-circular cross-section can, for example, permit the bellows to be matched to the arc shape of the perimeter of a brake disk or a brake drum. This produces effective and compact arrangements for transmitting high braking forces.

Alternatively, use can also be made of bellows with a circular shaped cross-section, to which is attached the brake material.

In the case of one configuration, the brake incorporates a control unit which is, for example, electrical or electronic, or a regulation unit. The control unit or regulation unit can be arranged outside the housing or can also be encapsulated in the housing.

The control unit or the regulation unit ensures, for example, anti-lock braking.

The control unit or the regulation unit can have a link to a central control/regulation unit, in particular via one of the above-mentioned bus systems or protocols, as applicable.

In one configuration, the fluid reservoir or the pressure production unit, as applicable, the switching unit and the pump unit are arranged in the interior of a wheel of a vehicle, enclosed by a tire. Thus these units are associated with precisely one wheel, unlike the familiar units which, for example, are used for simultaneous braking at two or four wheels. The wheel can be driven by a wheel hub motor or by another motor, in particular by a motor which drives more than one wheel.

The distance between the fluid reservoir or pressure production unit and the bellows can be less than 15 centimeters.

These measures result in short fluid paths, in particular short hydraulic paths. The entire length of the conduit for the brake for one wheel is, for example, less than 20 centimeters or less than 30 centimeters. The short paths permit braking which is highly dynamic, both in the actuation and the release of the brake.

Another exemplary embodiment relates to an actuation unit, comprising:

a housing,
a bellows, arranged on the housing or forming part of the housing, which incorporates an opening which leads into the interior of the bellows,
a fluid reservoir or pressure production unit arranged in the housing or forming part of the housing,
a conduit, arranged in the housing or forming part of the housing, which connects the fluid reservoir or the pressure production unit and the opening, or is part of a conduit system to which are adjoined the fluid reservoir or the pressure production unit and the opening.

The technical effects cited above for the brake apply, in particular, for the actuation unit, i.e. it is suitable for a simply constructed brake which, in particular, has a long service life and is low maintenance.

In one configuration, the actuation unit can be a component of a brake, in particular in a wheel hub motor.

The bellows, the fluid reservoir or pressure production unit, as applicable, and the conduit then form, in particular, a part of the housing if one of their outer walls forms a part of the outer wall of the housing.

In configurations, the actuation unit is used in combination with one of the exemplary embodiments or configurations explained above. Hence, the technical effects cited above apply correspondingly.

The brake or the actuation unit can incorporate a switching unit, in particular a switching unit which in the unexcited state opens a conduit for a fluid. It is thus possible in a simple way to fulfill the safety requirements for brakes or actuation units.

In other words, an encapsulated electro-hydraulic metal bellows brake can be used.

The electrification of automobiles also implies that the actuators in the vehicle are controlled by electric signals. Nowadays, the brakes or brake shoes, as applicable, in a vehicle are actuated hydraulically, for example. New electric/electronic (E/E) architectures in the vehicle can have a central vehicle controller in the vehicle, and can control all the actuators in the vehicle using electric signals.

A conventional hydraulic system continues to require maintenance. The medium which is used is subject to ageing, and must be disposed of. This produces liquids which are quite environmentally damaging. Especially for electric vehicles, recuperation is of interest because energy is recovered and can be used directly for drive purposes. In order to do this efficiently, a controller can decide which brake actuator it uses. Ultimately, a brake-by-wire brake may be necessary.

A central brake controller can control and regulate the hydraulic pressure for all four brakes in the vehicle. The driver can continue to have a mechanical access to the brake.

This means that the brake controller therefore cannot override the driver's wishes. Hydraulic lines which actuate the brake can be built into the vehicle. In parallel with these, electric lines can be wired into the vehicle, often to the same actuators, in order to report back status data. With the solutions used until now, the brake fluid must be replaced from time to time.

Various ways have already been investigated for actuating the brake using electrical signals:
electronic wedge brake (EWB),
lever transmission, and
ball screw drive.

In accordance with one exemplary embodiment, the brake cantilever can be actuated using an encapsulated hydraulic metal bellows. Pressure production, e.g. by piezoelement, intermediate storage of pressure, and force production can be miniaturized to such an extent that there is space for them in a metal bellows. The complete hydraulic system can be located in the metal bellows, i.e. the pressure production, intermediate storage of pressure and force production. The metal bellows and/or a housing joined to it can have a metallic seal. The hydraulic fluid is thus encapsulated with a completely metallic seal. The hydraulic paths in the system itself are very short, in particular shorter than 15 centimeters, so that it is possible to realize fast response times. It is possible to actuate the bellows using only the electric signals and an electric energy supply.

In FIG. 1, the principle of the construction is illustrated. For each individual friction brake in the vehicle, such an actuator can now be used for the purpose of actuating it.

The following are the technical effects which can be produced:
the actuation of brake actuators can be effected electrically, and indeed independently of the other brake actuators,
the brake fluid no longer needs to be replaced, because metallically sealed components mean that no ageing of the hydraulic fluid occurs, or only very little, i.e. no water absorption, no gas diffusion,
faster build up of brake pressure because of high hydraulic rigidity, because no hydraulic lines need to be installed in the entire vehicle,
metallically sealed components mean no/little ageing of the hydraulic fluid, i.e. no water absorption, no gas diffusion,
good vibration characteristics, due to the high inherent damping of the hydraulic fluid, and
high level of robustness due to the use of fixed mountings and hence small number of frictional pairings or guides, as applicable.

The exemplary embodiments and developments cited in the introduction can also be combined with each other and with the exemplary embodiments explained by reference to the figures.

FIG. 1 shows a vehicle 10 with four bellows brakes and hydraulic wheel modules. The vehicle 10 is, for example, an automobile, e.g. for transporting up to five people. Alternatively, the bellows brakes which are being explained can also be used on two-wheeled vehicles, such as bicycles, mopeds and motor bikes. In the case of other exemplary embodiments, the bellows brakes are also used on commercial vehicles, such as heavy goods vehicles.

The vehicle 10 is, for example an automobile with an electric drive, with a combustion engine or with a drive which is a hybrid of these two types of motor.

The vehicle 10 incorporates:
a disk brake 12, front, left,
a disk brake 14, front, right,
a disk brake 16, rear, right, and
a disk brake 18, rear, left.

Figure 3:
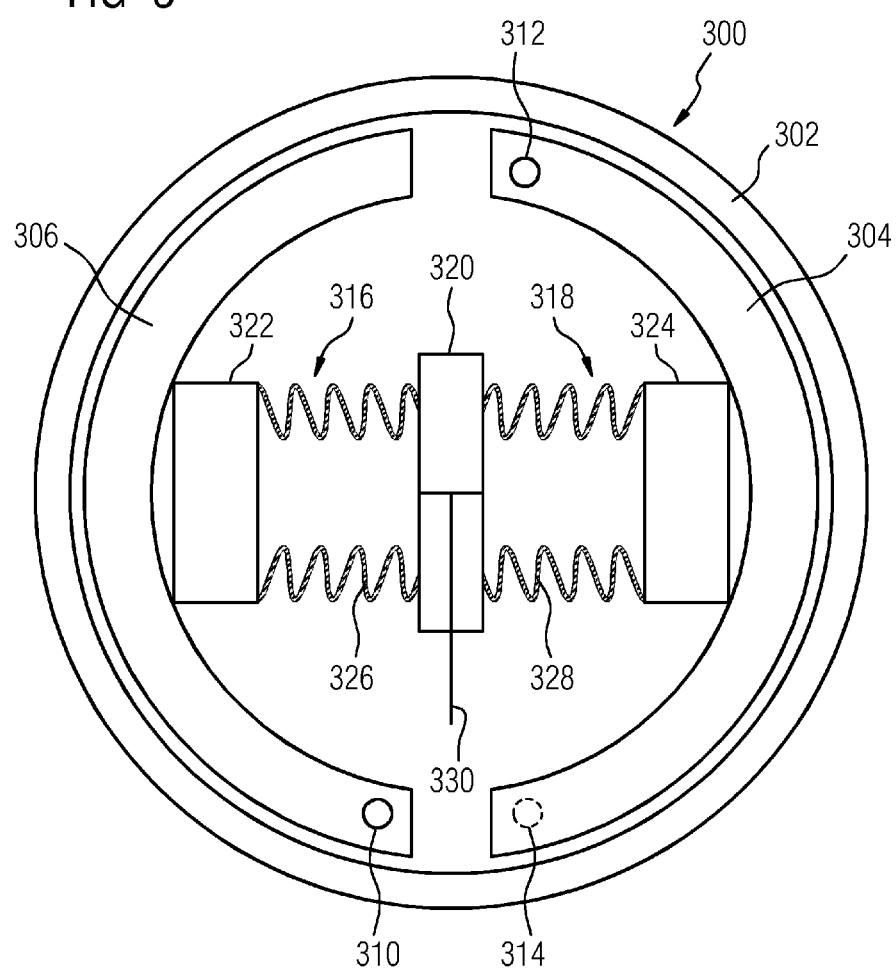
FIG. 3 shows a drum brake with bellows actuation unit.

Instead of all or specific ones of the disk brakes 12 to 18, it is also possible to use other brakes which are actuated by a bellows, in particular by a metal bellows, see for example the drum brake in FIG. 3.

The disk brake 12 incorporates a brake disk 22. The disk brake 14 incorporates a brake disk 24. Correspondingly, the disk brake 16 incorporates a brake disk 26 and the disk brake 18 a brake disk 28. The brake disks 22 to 28 are made, for example, from iron or steel.

Figure 2:
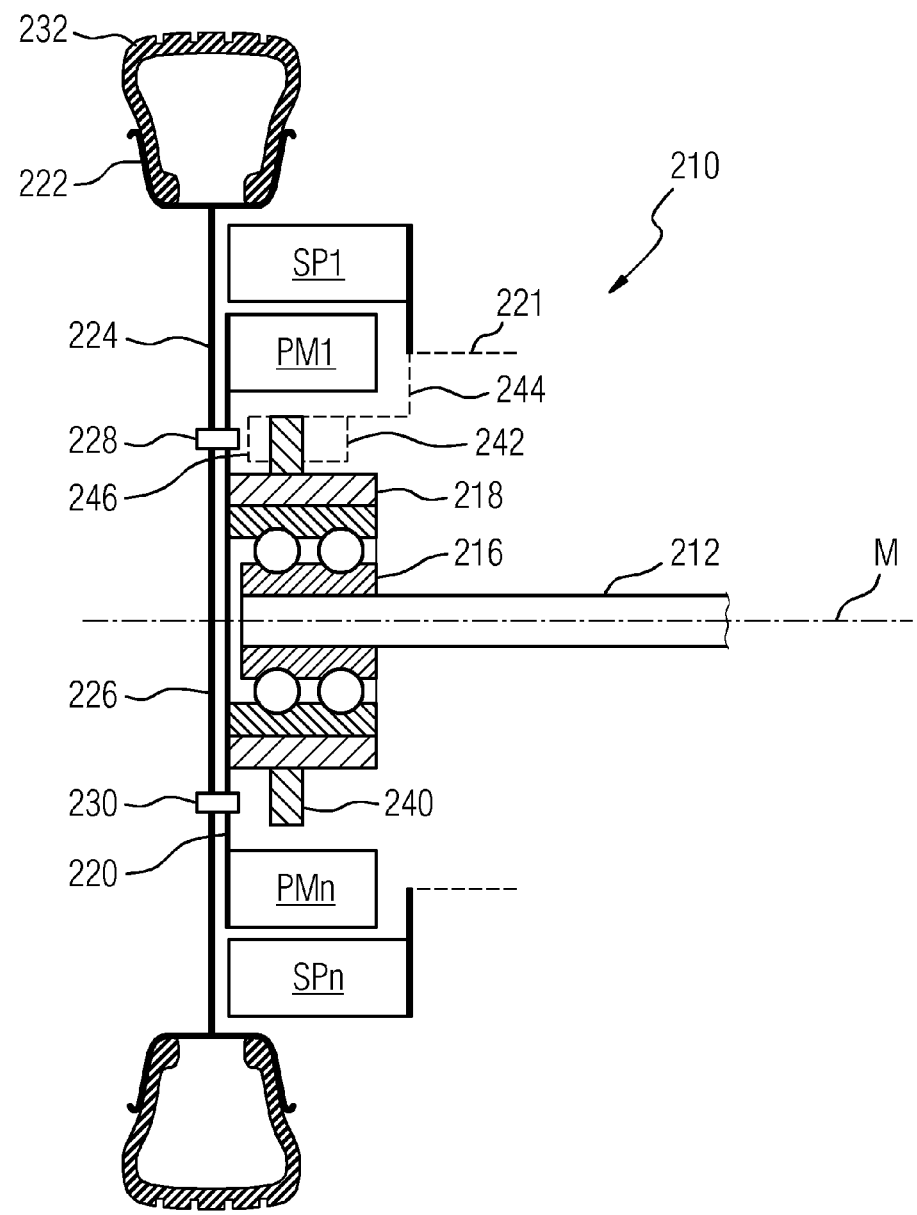
FIG. 2 shows a wheel hub motor with a bellows brake.

The disk brake 12 is explained in more detail below. The other disk brakes 14 to 18 are constructed like the disk brake 12. The disk brake 12 incorporates two fixing elements 30 and 32, with which the brake disk is attached centrally on an axle or on a wheel. FIG. 2 shows details of one fixing variant for the brake disk 22 in the case of an internal rotor wheel hub motor. Other motors, in particular other electric motors, can also be used for driving the wheel.

The fixing element 34 is, for example, a spacing washer for the gap to the wheel.

The vehicle 10 incorporates in addition a central brake controller 40, the design of which is, for example, either simple or redundant. The central brake controller 40 incorporates a processor and a memory unit, neither shown, in which are stored commands and data. The commands are executed by the processor. Alternatively, a central control unit with no processor can be used.

The central brake controller 40 converts the positioning movement, for example, of a brake pedal into an electric signal. In addition to this the central brake controller 40 can also initiate automatic braking, in the context of an automatic driver assist system.

On each wheel of the vehicle 10 there is, in addition, a modular wheel control device 42 to 48. The control device 42 is assigned to the left front wheel and, for example, fulfils tasks for the control or regulation of the braking force, e.g. as part of an ABS (anti-lock braking system) control procedure or of an ESP (electronic stabilization program) procedure. The control devices 44, 46 and 48 are constructed in the same way as the control device 42. The control devices 44, 46 and 48 are assigned respectively to the right front wheel, the right rear wheel and the left rear wheel. Each of the control devices 42 to 48 can incorporate a processor and a memory unit, neither shown, in which are stored commands and data. The commands are executed by the processor. Alternatively, modular wheel control units 42 to 48 which have no processor can be used.

There are the following data transmission links from the central controller 40 to the modular wheel control devices 42, 44, 46 and 48:
a data transmission link 52 to the control device 42,
a data transmission link 54 to the control device 44,
a data transmission link 56 to the control device 46, and
a data transmission link 58 to the control device 48.

The data transmission links 52 to 58 can be wired links, in which case use can be made, for example, of the protocols cited in the introduction.

Assigned to each wheel of the vehicle 10 there is, in addition, a hydraulic module, 62 to 68. The hydraulic module 62 is arranged on the left front wheel. The hydraulic modules 64, 66 and 68 are associated respectively with the right front wheel, the right rear wheel and the left rear wheel. The hydraulic modules 64, 66 and 68 are constructed in the same way as the hydraulic module 62, and are therefore not explained in more detail below.

Figure 4:
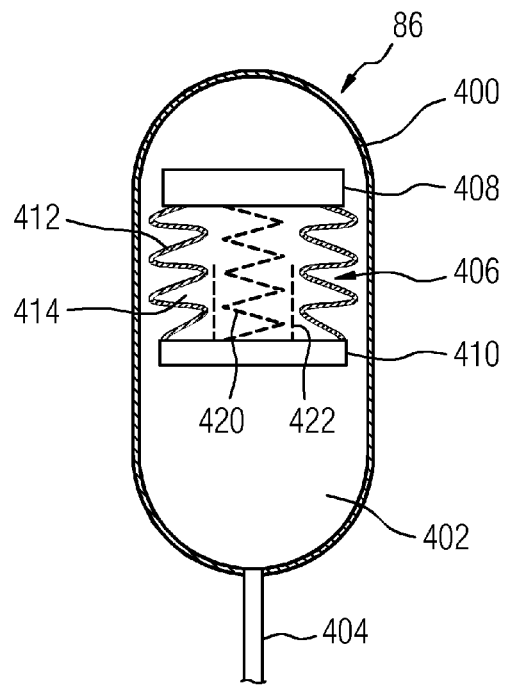
FIG. 4 shows a fluid reservoir.

The hydraulic module 62 incorporates:
a metal bellows 72,
a housing 80 which, in particular, has a metallically sealed joint to the metal bellows 72,
a pump motor 82 which, for example, is arranged in the housing 80,
a pump 84 (see arrow 85) which can preferably be operated bidirectionally and which is, for example, also arranged in the housing 80 and is driven by the pump motor 82,
a fluid reservoir 86, which is arranged in the housing 80 and the construction of which will be explained in more detail below by reference to FIG. 4 as an example,
a valve 88, which is also referred to as a switching unit or as a hydraulic switching unit and which is also arranged in the housing 80,
an electromagnet 90, which serves to actuate the valve 88 and which is also arranged in the housing 80.

In the housing 80 there is in addition a further hydraulic conduit system which incorporates the following components:
two junctions 92 and 94, alternatively another conduit system can be used,
as applicable, a line or conduit 96 from the pump 84 to the junction 92,
a line 98 between the junction 92 and the valve 88,
a line 100 between the valve 88 and the junction 94,
a line 102 between the junction 94 and the pump 84, and
a line 104 between the junction 94 and a connection 112 on the bellows 72.
The fluid reservoir 86 is also connected to the junction 92.

The bellows 72 incorporates:
a bellows closure 106, e.g. a metallic plate or disk, as applicable,
a bellows base 108, e.g. a metallic plate or disk, as applicable,
a surrounding corrugated metal wall 110,
an inlet opening 112, and
a bellows interior space 114 which is, in particular, filled with a fluid, for example with oil, in particular a silicon oil or a glycerin-based oil.

The bellows closure 106, or the base 108 of the bellows, as applicable, can be joined to the wall 110 using various jointing techniques, e.g. soldering, welding, pressing, crimping, etc. It is also possible to manufacture in one piece the bellows base 108 and bellows wall 110, or the bellows closure 106, bellows base 108 and bellows wall 110, for example by using galvanic processes.

A brake lining 116 is affixed to the bellows base 108 of the bellows 72, for example by using fixing elements which can be undone and/or adhesives.

An opposing brake lining 118 is arranged opposite the bellows 72 on the other side of the brake disk 22, for example by means of a fixing 120.

Metal bellows 74 to 78, corresponding to the metal bellows 72, are also arranged on the other disk brakes 14, 16 and 18.

In the case of an alternative exemplary embodiment, instead of the housing 80 a smaller housing 80a is used. The housing 80a surrounds at least parts of the pump 84, and the fluid reservoir 92 and also the valve 88. However, the housing 80a does not surround the pump motor 82 or the pump drive, as applicable. The housing 80a can be used, in particular, when use is made of a diaphragm pump in which the diaphragm is set in motion by a piston or a tappet or a piezocrystal.

In place of the pump motor, it is also possible to use another drive, for example a piezocrystal, in particular an encapsulated piezocrystal.

When the vehicle 10 is in operation, the valve 88 is initially switched to the closed position as shown in the Figure. In the event of a fault there might, for example, no longer be an electric voltage across the electromagnet 90 of the valve 88, whereupon a spring element, which is not shown, pushes the valve back into a closed position. As a result, fluid can flow from the bellows into the fluid reservoir 86 because of the restoring force of the bellows. The brake is thus inherently safe and in the event of a fault no braking force occurs.

When a braking signal is generated on the data transmission link 52, the control device 42 actuates the pump 84 in such a way that fluid is forced out of the fluid reservoir 86 into the bellows 72. Hence, the brake material 116 is pressed onto the brake disk 22 and produces a braking effect.

At the end of the braking operation an electric signal, for example, appears on the data transmission link 52, prompting the modular wheel control device 42 to operate the pump 84 in the reverse direction, so that a reduction in pressure takes place in the bellows 72 in that liquid is pumped out of the bellows into the fluid reservoir 86.

Typical working pressures of the brake lie in the range, for example, from 10 to 10 bar.

The disk brakes 12 to 18 may be, for example, floating caliper brakes or even fixed caliper brakes.

Figure 6:
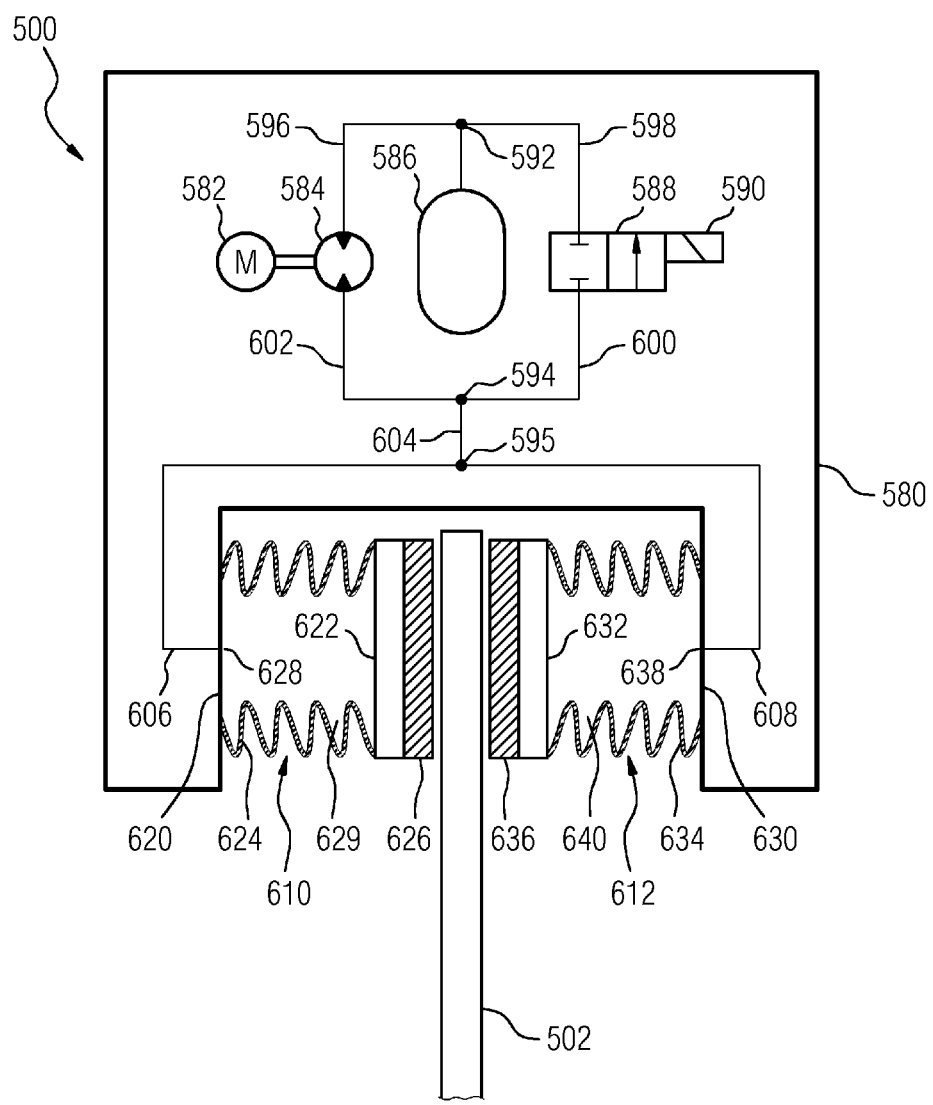
FIG. 6 shows a bellows brake with two bellows facing each other.

On the vehicle 10, it is also possible to use several bellows on each disk brake, see for example FIG. 6. Alternatively, several bellows can be arranged on one side of the brake disk.

Adjustment devices can be provided which take account of the wearing down of the brake linings. However, readjustment can also be effected in that the bellows 72 is arranged in such a way that readjustment is effected by the excursion of the bellows 72.

FIG. 2 shows a wheel hub motor 210 which is arranged on a vehicle axle 212. This is, for example, an internal rotor motor. The wheel hub motor 210 has a bellows brake 242.

A radial bearing 216 is attached by its inner side to the vehicle axle 212 and on its outer side is located or fixed, as applicable, in a bearing block 218. A rotor base-plate 220 has, for example, a circular shaped perimeter and can form the sidewall of a rotor housing. Affixed to the perimeter of the base-plate 220 are permanent magnets PM1 to PMn, e.g. 212 of them. Typically, between 100 and 250 permanent magnets can be used.

Mounted on a stator housing 221 are coils or windings SP1 to SPn, e.g. 212 or 224 windings, which are referred to below as W1 to Wn.

An assembly comprising a wheel 222, a wheel rim 224 and a wheel flange is attached to the internal rotor, or more precisely onto the plate 220, by means of wheel bolts 228, 230 or wheel nuts, as applicable. A tire 232 is carried on the wheel 222 or is supported on the wheel 222.

The wheel hub motor 210 can have a dimension along its central axis M which is less than its diameter, in particular less than half the diameter. Its length is determined, for example, by the length of the coils SP1 or by the length of a housing. The diameter is determined for example by the position of the outer surfaces of the coils SP1 to SPn or by a housing.

Instead of the wheel hub motor 210, another wheel hub motor can also be used, for example with a squirrel-cage rotor (end-ring rotor). Instead of a wheel hub motor 210 with an internal rotor, it is also possible to use a wheel hub motor with an external rotor, comprising permanent magnets or an end-ring rotor.

However, other electric motors can also be used, in particular an asynchronous motor or a synchronous motor with a length in the longitudinal direction along the axis of rotation which is greater than the external diameter of the electric motor concerned. It is also possible to use electronically commutated DC motors.

The electric motor can be used in a transport machine or another machine, e.g. in a machine tool or the like. The same principles can be used not only for the braking of motors but also for braking generators.

A brake disk 240 corresponding to the brake disk 22 is attached, for example, to the outside of the bearing block 218. A metal bellows 242, corresponding to the bellows 72, is arranged, for example using a brake mounting plate 244, on the stator housing 221 or is permanently joined to the vehicle chassis. In making the attachment, it is also possible to make use of a housing corresponding to the housing 80 or 80a, as applicable. The housing 80 or 80a is, for example, manufactured from a metal or a metallic material, in particular from steel.

An opposing brake lining 246 is also attached to the vehicle housing.

The disk brake shown in FIG. 2 can again be a floating caliper brake or a fixed caliper brake. Alternatively, a drum brake can be used in the wheel hub motor 210, see for example FIG. 3.

The brake for the wheel hub motor 210 is actuated, for example, in the way explained above by reference to FIG. 1, i.e. by a modular wheel control device and a central brake controller.

The brake shown in FIG. 2 can also be used for a wheel which has no wheel motor or no wheel hub motor, in particular in the case of a central electric drive, a hybrid drive or a combustion engine drive.

FIG. 3 shows a drum brake 300 with a bellows actuation unit. The drum brake 300 incorporates:
  a brake drum 302,
  two arc-shaped curved brake shoes 304, 306, which are arranged on the perimeter of the wall of the brake drum 302,
  two pivot bolts 310 and 312 as bearing mounts for the brake shoes 304, 306, and
  two metal bellows 316, 318.

The two metal bellows 316, 318 are closed off by a common closure plate 320.

The metal bellows 316 incorporates:
  a bellows base 322,
  a wall, e.g. a corrugated metal wall 326, together with
  a part of the closure plate 320.

The metal bellows 318 incorporates:
  a bellows base 324,
  a wall, e.g. a corrugated metal wall 328, together with
  a part of the closure plate 320.

Arranged in the closure plate 320 is a hydraulic conduit 330 which branches towards each of the bellows 316 and 318.

The base of the metal bellows 316 rests against the brake shoe 306. On the other hand, the base of the metal bellows 318 rests against the brake shoe 304.

The arrangement of the pivot bolts 310 and 312 shown in FIG. 3 means that the two brake shoes 304, 306 are either both leading or both trailing, depending on the direction of rotation.

Braking is effected by the drum brake 300 in that a pressure is built up, through the hydraulic conduit 330, which extends the bellows 316 and 318, with the result that the brake shoes 304 and 306 are pressed outward against the rotating drum 302, and institutes the braking effect. If the pressure is reduced in the hydraulic duct 330, then a restoring force from the bellows walls 326, 328, or from an optional additional restoring element such as for example a coil spring, takes effect.

In one variant, instead of the pivot bolt 312 use is made of a pivot bolt 314, i.e. the brake shoes 304, 306 have bearing mounts at ends which are neighboring one another. In this case one brake shoe 304, 306 is always leading and the other a trailing brake shoe, depending on the direction of rotation.

The drum brake can be a simplex brake, a duplex brake or a dual servo brake. The bellows can also rest against the ends of the brake shoes. There can be more than two bellows, arranged behind one another and/or even parallel to each other. Exemplary embodiments with only one bellows are also possible.

Figure 7:
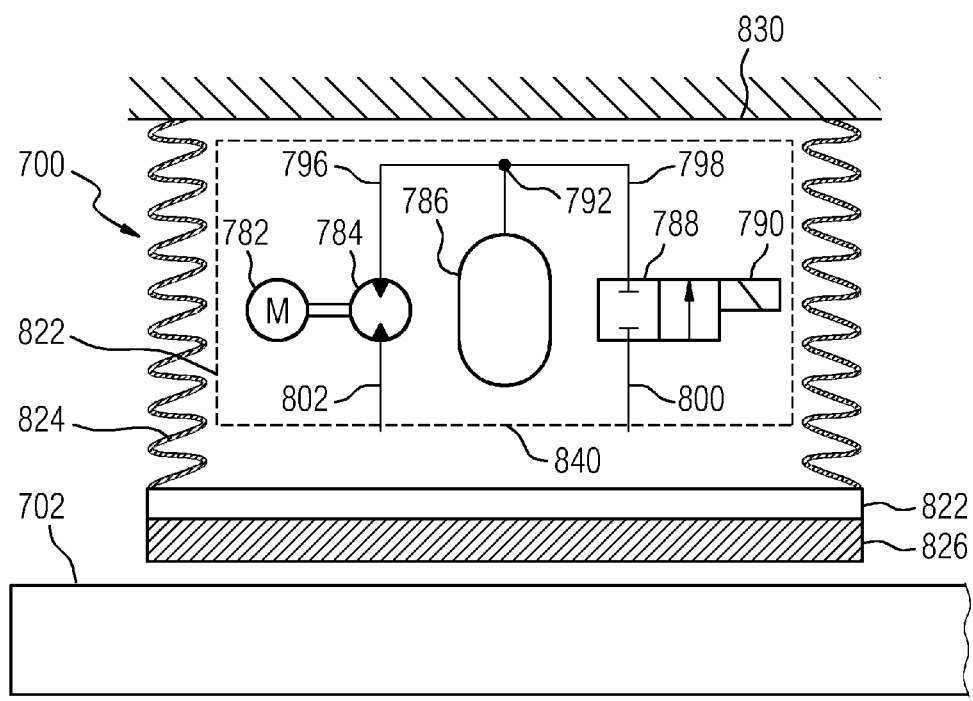
FIG. 7 shows a bellows brake with built-in items in the bellows.

The components of the hydraulic unit can also be arranged in the interior of the brake drum 302, in particular outside the bellows or also within the bellows, see FIG. 7. A housing with a metallic seal can surround the hydraulic unit and, for example, be adjoined to the bellows.

FIG. 4 shows a fluid reservoir which, for example, corresponds to the fluid reservoir 86. The fluid reservoir 86 incorporates:
  a metallic fluid reservoir wall 400 which, for example, is oval or cylindrical shaped, as appropriate, with a hemispherical shaped or rounded base or cover, as applicable,
  a fluid reservoir interior space 402,
  a connection line 404, and
  at least one metal bellows 406 which, for example, can be made in one piece.

The metal bellows 406 incorporates:
  a closure plate 408,
  a bellows base 410,
  a corrugated metal wall 412, and
  a bellows interior space 414.

An optional coil spring 420 can be arranged in the interior of the bellows 406. Alternatively, other spring elements can be used instead of the coil spring 420, for example disk springs.

Arranged in the bellows 406 there can be an optional guide 422 for the coil spring 420 or for the other spring element, for example a guide bore.

The interior space of the bellows 406 can be filled with air or with a gas. There can be a gas connection or a bleed or ventilation connection leading to the outside, but not necessarily. A suitable gas is, for example, nitrogen or air. In the interior space of the bellows 406, the ambient pressure can be atmospheric or some other pressure.

When the fluid reservoir 86 is operating, the bellows 406 is compressed by an external pressure, so that the fluid can be stored in the fluid reservoir 86. If an opportunity is provided for the pressure in the fluid reservoir 86 to be relieved, or if the fluid is pumped out, then the bellows 406 can, possibly assisted by the spring elements, promote the egress of the fluid from the interior space 402 of the fluid reservoir into the connection line 404.

Figure 5:
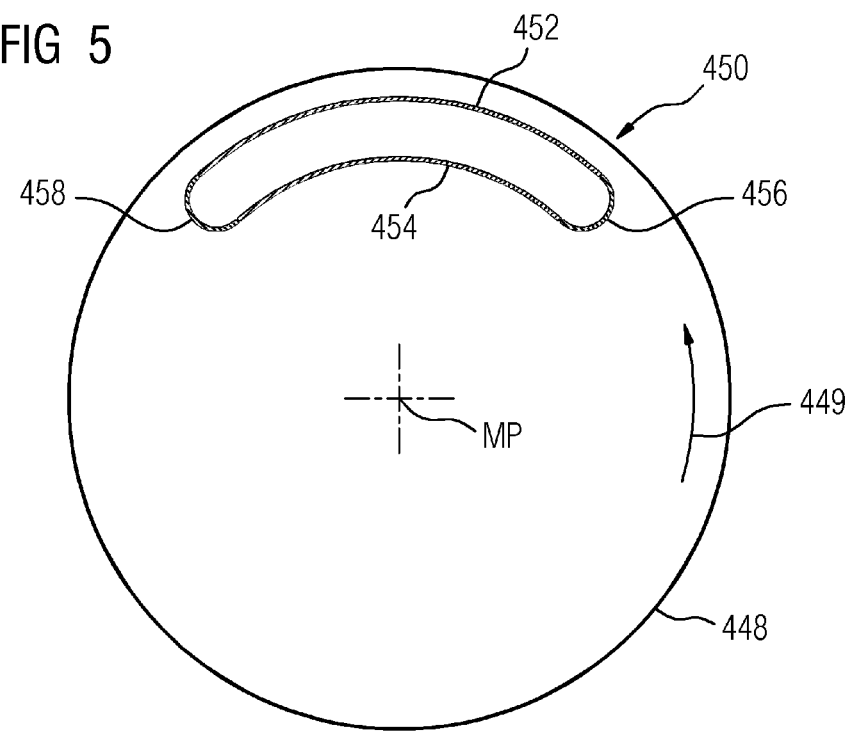
FIG. 5 shows a cross-section through the sidewall of a corrugated metal bellows.

FIG. 5 shows a cross-section through the side wall of a corrugated metal bellows 450, e.g. the bellows 72, 610, 622, 700.

The cross-section of the corrugated metal bellows 450 is matched to a brake disk 448 which rotates about a mid-point MP, see arrow 449. The plane in which the cross-section illustrated lies is parallel to a closure, not shown, on the bellows or to a base of the bellows, not shown.

The corrugated metal bellows 450 incorporates:
  an arc-shaped curved outer wall 452, which has a first radius of curvature, an arc-shaped curved inner wall 454, which has a second radius of curvature, which is less than the first radius of curvature, a curved right-hand side wall 456, and a curved left-hand side wall 458.

The first radius of curvature is the same, for example, as the radius to which the outer wall 452 is arranged relative to the brake disk 448. Similarly, the second radius of curvature is the same, for example, as the radius to which the inner wall 454 is arranged relative to the brake disk 448, i.e. as the distance from the mid-point MP up to the inner wall 454 in the case of the view shown in FIG. 5 of the brake disk 448.

Alternatively, bellows 72, 610, 622, 700 with a circular shaped cross-section can be used. In the case of a drum brake too, the bellows can be extended in the circumferential direction of the drum wall.

FIG. 6 shows a bellows brake 500 with two bellows 610 and 612 which face each other, i.e. a fixed caliper brake. A housing 580 surrounds a hydraulic module which, for example, corresponds to the hydraulic module 62 and which incorporates the following units:

a pump motor 582 which, for example, is arranged in the housing 580, a pump 584 which, for example, is also arranged in the housing 580 and which is driven by the pump motor 582, a fluid reservoir 586 which is arranged in the housing 580 and the design of which corresponds, for example, to the example explained above with reference to FIG. 4, a valve 588, which is also referred to as a switching unit or a hydraulic switching unit, and which is also arranged in the housing 580, an electromagnet 590 which serves to actuate the valve 588 and which is also arranged in the housing 80.

The valve 588 is, for example, a "normally open" valve.

In the housing 580 there is in addition a hydraulic conduit system which incorporates the following components:

three junctions 592, 594 and 595, or alternatively another conduit system can be used, a line or a conduit 596, as applicable, from the pump 584 to the junction 292, a line 598 between the junction 592 and the valve 588, a line 600 between the valve 588 and the junction 594, a line 602 between the junction 594 and the pump 584, and a line 604 between the junction 594 and the junction 595, a line 606 between the bellows 610 and the junction 595, and a line 608 between the bellows 612 and the junction 595.

The fluid reservoir 586 is also connected to the junction 592.

The bellows 610 incorporates:

a bellows closure 620, e.g. a metallic plate or disc, as applicable, a bellows base 622, e.g. a metallic plate or disc, as applicable, a surrounding corrugated metal wall 624, an inlet opening 628, and a bellows interior space 629 which is filled, in particular, with a fluid, for example with oil, in particular a silicon oil or a glycerin-based oil.

Affixed to the bellows base 622 of the bellows 610 is a brake lining 626.

The bellows 612 incorporates:

a bellows closure 630, e.g. a metallic plate or disk, as appropriate, a bellows base 632, e.g. a metallic plate or disk, as appropriate, a surrounding corrugated metal wall 634, an inlet opening 638, and a bellows interior space 640 which is, in particular, filled with a fluid, for example with oil, in particular a silicon oil or a glycerin-based oil.

Affixed to the bellows base 632 of the bellows 612 is a brake lining 636.

The bellows brake 500 is in the form of a disk brake 500. A brake disk 502 is arranged between the two bellows 610 and 612. The housing 580 wraps around the brake disk 502.

The bellows brake 500 functions essentially like the brake 12, see the configurations for FIG. 1.

Once again, the bellows brake 500 can be in the form of a fixed caliper brake or a floating caliper brake. In the case of one variant, the pump motor 582 or some other pump drive unit such as a piezocrystal, as applicable, can be arranged outside the housing 580, in particular in the case of a diaphragm pump whose diaphragm is part of the housing 580.

The bellows 610 or 612, as applicable, can have a cross-section which is circular shaped in a plane lying parallel to the bellows closure 620 or parallel to the bellows base 622, as applicable. Alternatively, a bellows with a cross-section matched to the brake disk or to a brake drum will be used, see FIG. 5.

It is also possible to use only one bellows 610 or 612, with a brake lining as the counterpiece, in particular when the housing 580 has a floating mounting.

FIG. 7 shows a bellows brake 700 with built-in items built into the bellows. It follows that a housing is formed by a bellows base 822, a bellows wall 824 and a bellows closure 830, where the bellows base 822, bellows wall 824 and bellows closure 830 can also be constructed in one piece. The advantage of the bellows brake 700 can consist in the fact that it has a compact construction in which the incompressible built-in items increase the mechanical rigidity of the bellows in the bellows brake.

The bellows in the bellows brake 700 surround a hydraulic module which, for example, corresponds to the hydraulic module 62 and which incorporates the following units:

a pump motor 782 which, for example, is arranged in the bellows of the bellows brake 700, a pump 784 which, for example, is also arranged in the bellows of the bellows brake 700 and which is driven by the pump motor 782, a fluid reservoir 786 which is arranged in the bellows of the bellows brake 700 and the construction of which corresponds, for example, to the example explained above with reference to FIG. 4, a valve 788 which is also referred to as a switching unit or a hydraulic switching unit and which is also arranged in the bellows of the bellows brake 700, an electromagnet 790 which serves to actuate the valve 788 and which is also arranged in the housing 80.

In the bellows of the bellows brake 700 there is in addition a hydraulic conduit system which incorporates the following components:

a junction 792, alternatively another conduit system can be used, a line or conduit 796, as appropriate, from the pump 784 to the junction 792, a line or conduit 798, as appropriate, between the junction 792 and the valve 788, an optional line or a conduit 800, as appropriate, between the valve 588 and a part of the interior space 832, of the bellows in the bellows brake 700, which faces towards the bellow base 822, and an optional line or a conduit 802, between the part of the interior space 832 which faces the bellows 822 and the pump 784.

The valve 788 can also open out directly into the interior space 832 of the bellows if no line or conduit 800, as applicable, is provided. So too, the pump 834 can be connected directly to the bellows interior space 832 if no line or conduit 802, as applicable, is provided.

The fluid reservoir 886 is also connected to the junction 892.

The bellows of the bellows brake 700 incorporates:
the bellows closure 830, e.g. a metallic plate or disk, as appropriate, with no opening for a liquid,
the bellows base 822, e.g. a metallic plate or disk, as appropriate, again with no opening for a liquid,
a surrounding corrugated metal wall 824, which again contains no opening for the passage of a fluid through it, and
a bellows interior space 832 which, in particular, is essentially completely filled, i.e. apart from the built-in items, with a fluid, for example with oil, in particular a silicon oil or a glycerin-based oil.

Attached to the bellows base 822 of the bellows in the bellows brake 700 is a brake lining 826.

The bellows brake 700 is in the form of a disk brake 700. A brake disk 802 is arranged on the bellows of the bellows brake 700.

There can be an encapsulation 840 which encloses the built-in items, i.e. a type of inner housing. Alternatively it is also possible for the motor 782, if necessary a part of the pump 784 and/or the electromagnet 790 of the valve 788 to be arranged outside the bellows of the bellows brake 700, for example in the region of the bellows closure 830.

The bellows brake 700 functions essentially like the brake 12, see the configurations for FIG. 1.

Once again, the bellows brake 700 can be in the form of a fixed caliper brake or a floating caliper brake. With one variant, the pump motor 782 or another pump drive unit, for example a piezocrystal, as applicable, can be arranged outside the bellows, in particular in the case of a diaphragm pump for which the diaphragm is part of the bellows.

The bellows of the bellows brake 700 can have a cross-section which is circular shaped in a plane lying parallel to the bellows closure 830 or parallel to the bellows base 822, as applicable. Alternatively, a bellows with a cross-section which is matched to the brake disk or to a brake drum will be used, see FIG. 5.

The bellows 830 can also be designed to wrap around the brake disk 702. In the bellows of the bellows brake 700, it is also possible that other conduits are formed.

The bellows brake 700 can also be used with a drum brake, see FIG. 3. For example, several bellows will then be used, in each of which there are built-in items. Alternatively, a very elongated bellows can be used, in which are located the built-in items.

The exemplary embodiments explained by reference to the figures can, in particular, be combined with the exemplary embodiments cited in the introduction. The exemplary embodiments are not to-scale, and not restrictive. Adaptations within the context of a specialist's work are possible. Although the invention has been illustrated and described in more detail by the preferred exemplary embodiments, the invention is not restricted to the examples disclosed, and other variations can be derived from them by the specialist, without going outside the scope of the invention's patent protection.

What is claimed is:

1. A brake, comprising:
   a bellows comprising an opening that leads into the interior of the bellows,
   a brake element coupled to the bellows,
   a rotational element arranged at a distance from the brake element,
   a fluid reservoir or a pressure production unit, and
   a first conduit between the fluid reservoir or the pressure production unit and the opening of the bellows,
   a switching unit configured to control a fluid flow between the between the fluid reservoir or pressure production unit and the opening of the bellows via the first conduit, and
   a housing that contains the fluid reservoir, the switching unit, and the first conduit.

2. The brake of claim 1, wherein the bellows comprises metal.

3. The brake of claim 1, wherein the fluid reservoir further comprises an additional bellows.

4. The brake of claim 3, wherein the additional bellows comprises metal.

5. The brake of claim 1, wherein the rotational element is a circular shaped plate or a drum.

6. The brake of claim 1, wherein the switching unit is a valve.

7. The brake of claim 1, comprising a pump unit in addition to the fluid reservoir.

8. The brake of claim 7, comprising a drive unit for the pump unit.

9. The brake of claim 1, comprising a second conduit between the fluid reservoir or the pressure production unit and the opening, wherein the housing that contains the second conduit.

10. The brake of claim 9, wherein the housing comprises a metallic seal or a metallically sealed coupling to the bellows.

11. The brake of claim 1, wherein the bellows includes a non-circular cross-section.

12. The brake of claim 1, wherein the gap between the fluid reservoir or pressure production unit and the bellows is less than 15 centimeters.

13. An actuation unit, comprising:
    a housing,
    a bellows arranged on the housing or which forms a part of the housing, the bellows comprising an opening that leads into an interior of the bellows,
    a fluid reservoir or pressure production unit arranged in the housing or which forms a part of the housing,
    a conduit arranged in the housing or which forms a part of the housing, wherein the conduit connects the fluid reservoir or the pressure production unit and the opening or wherein the conduit is a part of a conduit system to which the fluid reservoir or the pressure production unit and the opening are connected, and
    a switching unit configured to control a fluid flow between the between the fluid reservoir or pressure production unit and the opening of the bellows via the conduit,
    wherein the switching unit is arranged in the housing.

14. The brake actuation unit of claim 13, wherein the switching unit, in an unexcited state, opens a conduit for a fluid.

15. An actuation unit, comprising:
    a braking element;
    an expandable bellows coupled to the braking element and defining an expandable interior volume,
    at least one of a fluid reservoir or a pressure production unit arranged within the bellows, a valve arranged within the bellows and configured to control a fluid flow between the at least one of the fluid reservoir or pressure production unit and the expandable interior volume of the bellows to control an expansion of the bellows and thereby control a movement of the braking element.

16. The actuation unit of claim 15, wherein the fluid reservoir further comprises an additional bellows.

17. The actuation unit of claim 15, comprising a pump unit.

18. The actuation unit of claim 17, comprising a drive unit for the pump unit.

19. The actuation unit of claim 15, wherein the bellows includes a non-circular cross-section.

* * * * *